United States Patent [19]

Frank et al.

[11] Patent Number: 5,358,635
[45] Date of Patent: Oct. 25, 1994

[54] INTEGRATED REVERSE OSMOSIS WATER TREATMENT AND STORAGE SYSTEM

[75] Inventors: Marlin A. Frank, Minneapolis, Minn.; Kenneth J. Merchak, Hudson, Wis.

[73] Assignee: Ecowater Systems, Inc., Woodbury, Minn.

[21] Appl. No.: 48,602

[22] Filed: Apr. 16, 1993

[51] Int. Cl.$^5$ ............................................. B01D 61/08
[52] U.S. Cl. .................. 210/90; 210/257.2; 210/259
[58] Field of Search ............... 210/257.2, 90, 85, 134, 210/136, 259

[56] References Cited

U.S. PATENT DOCUMENTS

| | | | |
|---|---|---|---|
| 3,679,055 | 7/1972 | Clark et al. | 210/257.2 |
| 3,746,640 | 7/1973 | Bray | 210/23 |
| 3,821,108 | 6/1974 | Manjikian | 210/23 |
| 3,839,201 | 10/1974 | Miller | 210/22 |
| 3,846,295 | 11/1974 | Gibbs | 210/23 |
| 3,969,241 | 7/1976 | Skrabak et al. | 210/23 |
| 4,385,992 | 5/1983 | Clauer et al. | 210/662 |
| 4,431,019 | 2/1984 | Kopp et al. | 210/433 |
| 4,579,662 | 4/1986 | Jonsson | 210/636 |
| 4,637,101 | 1/1987 | Fiedler | 244/122 |
| 4,793,932 | 12/1988 | Ford et al. | 210/636 |
| 4,808,287 | 2/1989 | Hark | 210/637 |
| 4,997,569 | 3/1991 | Sirkar | 210/637 |

*Primary Examiner*—Frank Spear
*Attorney, Agent, or Firm*—Jon Carl Gealow; James M. Wetzel

[57] ABSTRACT

A reverse osmosis water processing and storage system having a prefilter, reverse osmosis membrane assembly, and a storage volume contained within a first tank. The prefilter and reverse osmosis membrane assembly are located within a second tank which is in turn located within an expandable bladder which is received within the first tank. Processed water is stored in the volume provided between the second tank and the expandable bladder.

17 Claims, 3 Drawing Sheets

INTEGRATED REVERSE OSMOSIS WATER TREATMENT AND STORAGE SYSTEM

BACKGROUND OF THE INVENTION

1. Field of the Invention

This invention relates to a reverse osmosis water treatment and storage system. More particularly, it relates to an integrated reverse osmosis water treatment and storage system for use in supplying drinking water. A reverse osmosis system for supplying drinking water from a raw water source usually includes a prefilter, a reverse osmosis membrane, a post filter, and a means for storing the product or processed water.

2. Background Information

Reverse osmosis water processing systems are used to provide purified water for human consumption. Such systems customarily included four separate components, a prefilter, a reverse osmosis filter, a post filter and a storage tank for the product or processed water. With each of these components being provided as a separate unit, a complete system occupies a considerable amount of space. It is frequently desirable to install a reverse osmosis water processing system within the cabinet space under a sink. If a system is installed under a sink, a considerable amount of space which might otherwise be used for storage is lost. Further, when each system component is provided as a separate unit, the installation of the water processing system is quite labor intensive.

SUMMARY OF THE INVENTION

As the population becomes more and more concerned about the quality of water, particularly that used for cooking and drinking, the installation of reverse osmosis systems at the point of use to provide purified water has become more frequent. As the demand for such units increases, so does the desirability of simplifying not only the reverse osmosis assembly itself, but also the labor involved in installing the system.

Accordingly, it is an object of this invention to provide an integrated reverse osmosis water processing and storage system. It is a further object of this invention to provide a reverse osmosis water processing and storage system consisting of a prefilter, reverse osmosis filter and processed water storage tank as a unitary structure all contained within a single outer tank. It is a further object of this invention to provide an integrated water processing system wherein a prefilter, a reverse osmosis filter and processed water storage are provided within a single tank, and with a post filter associated with the tank such that the entire system may be installed as a single unit. It is a further object of this invention to provide an integrated reverse osmosis water processing and storage system wherein only three water flow connections need to be made to install the system. Those connection being for a supply of raw water, for the discharge of reject water, and for providing processed water for use.

In accordance with this invention, an integrated reverse osmosis water processing and storage system is provided in which a prefilter surrounds a reverse osmosis membrane assembly. Raw or supply water flows through the prefilter from it outer cylindrical surface to its inner cylindrical surface. The filtered water is then applied to the outer surface of the reverse osmosis membrane. Processed or product water which has passed through the membrane enters a hollow central core of the reverse osmosis membrane. The prefilter and reverse osmosis membrane assembly are housed within a first tank or container. An open end of the tank, through which the prefilter and membrane assembly are inserted into the tank is closed by a cap so as to provide a closed container.

A first opening is provide in the closed container for providing a supply of raw water to the prefilter. A second opening is provided for discharging reject water from the reverse osmosis filter.

The closed container is placed within a second tank with sufficient space provide between them for the storage of processed water. A flexible bladder surrounds the first container and receives processed water through a third opening in the first container from the reverse osmosis filter. The flexible bladder expands toward the inner surface of the second tank as it is filled with processed or produce water. The space between the inner surface of the second tank and the outer surface of the bladder is charged with air to maintain the processed water in the bladder under pressure. In accordance with the ideal gas law, as the air volume is reduced and the liquid volume increased, the air is compressed thereby increasing the pressure in the storage tank. This pressure is the driving force for processed water delivery from within the bladder.

An automatic shut-off check valve is provided in the feed water supply path to the prefilter such that when the stored product water reaches a predetermined pressure, the supply of feed water is terminated. A check valve is provided in the third opening in the first container such that processed water can only flow from the membrane to the storage volume within the bladder and not in the reverse direction. A post filter may be secured to the outer tank, such that water flowing from the storage volume passes through the post filter prior to it being supplied for drinking or other purposes.

DETAILED DESCRIPTION OF THE PREFERRED EMBODIMENT

Figure 1:
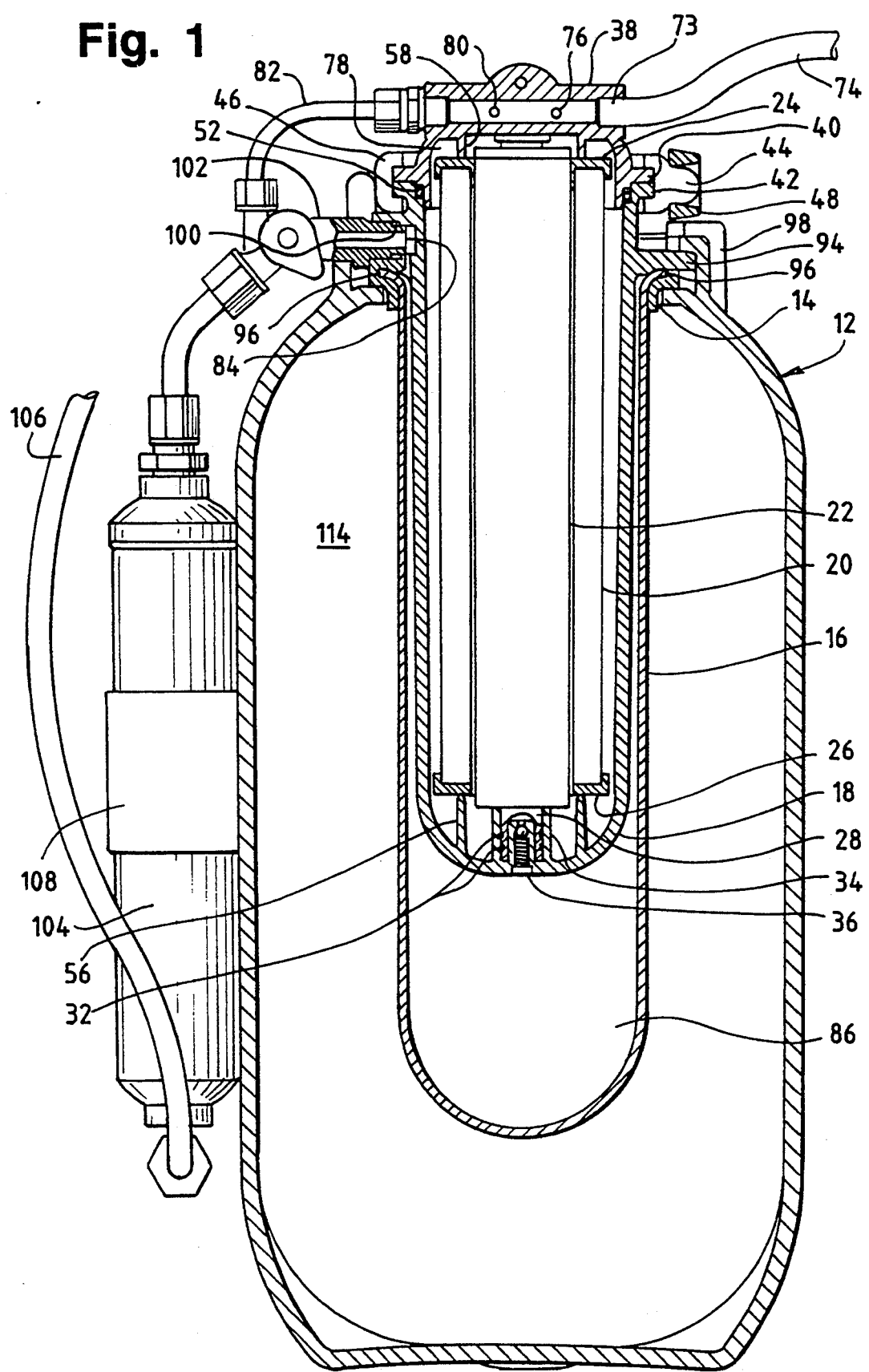
FIG. 1 is a first cross section of an integrated reverse osmosis water processing and storage system in accordance with this invention.
Figure 2:
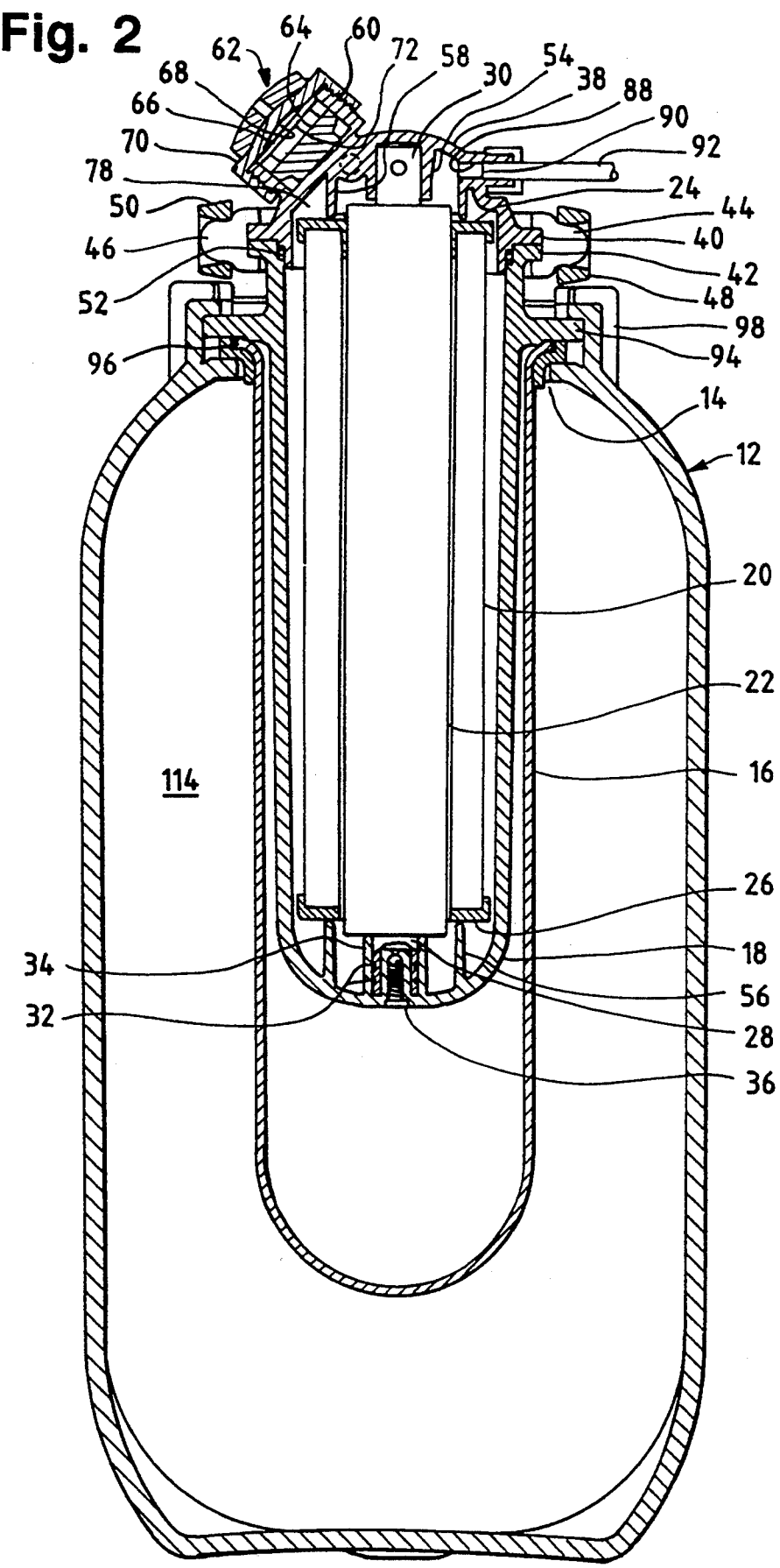
FIG. 2 is a second cross section of the integrated reverse osmosis water processing and storing system of FIG. 1 taken along a plane perpendicular to the plane of FIG. 1.

Referring the FIGS. 1 and 2, the entire water processing and storage system is contained within or mounted upon a pressure tank 12. The pressure tank 12, which preferably is of cylindrical shape, is provided with an enlarged circular opening 14 at the top for receiving an assembly comprising a processed water storage bladder 16 and a second, preferably cylindrical, tank or enclosure 18. With the enclosure 18 being of the preferred cylindrical shape, a hollow cylindrical prefilter 20 and a cylindrical hollow reverse osmosis membrane assembly 22 are supported within the tank 18.

The hollow cylindrical prefilter 20, which may be formed of polypropylene fibers or other suitable material, is provided with end caps 24 and 26 which prevent the flow of water through its ends. The reverse osmosis membrane assembly 22 is also of cylindrical shape and is provided with hollow cylindrical extensions 28 and 30 at its ends. A pair of grooves are formed in extension 28, for receiving O-rings 32. A cylindrical wall 34 projecting inwardly from the bottom of the tank 18 receives the cylindrical extension 28, with the O-rings 32 forming a water tight seal between the cylindrical wall 34 and the extension 28. A check valve assembly 36 located at the center of the lower end of the tank 18 is received within the hollow extension 28.

The open end of the second tank end is closed by a cap 38. A flange 40 provided on the cap 38, and a flange 42 provided on the tank 18 are secured to each other by a pair of clamps 44 and 46 and a pair of clips 48 and 50. A water tight seal is provided between the tank 18 and the cap 38 by an O-ring 52. A cylindrical wall 54 which projects inwardly from the cap 38 receives the cylindrical extension 30 of the reverse osmosis membrane assembly. The end of cylindrical extension 30 is sealed off internally to prevent the flow of water therethrough.

Second inwardly projecting cylindrical walls 56 and 58 are provide on the bottom of the second tank 18 and on the cap 38 respectively, surrounding and concentric with the walls 34 and 54. the inwardly projecting ends of walls 56 and 58 engage the end caps 26 and 24 respectively of the prefilter 20 to secure the prefilter in a predetermined position and to prevent the flow of water around the ends of the prefilter 20.

An externally threaded aperture 60 is provided in the cap 38 for receiving a shutoff valve assembly 62. The shutoff valve 62 is of the pressure actuated diaphragm type. A diaphragm 64 is exposed on one side 66 to a pressure chamber 68 formed by a cover 70 of the shutoff valve. The opposite side 72 of the diaphragm, depending upon the pressure in the chamber 68, opens or closed a flow path for providing raw water to the prefilter. A passageway 73 in cap 38 is connected to a pipe 74 through which raw or supply water is provided to the system. The passageway 73 is in turn connected to a passageway 76 which opens to the opposite side 72 of the diaphragm. Another passageway 78 formed in the cap 38 leads from the opposite side 72 of the diaphragm to the space surrounding the prefilter 20 in the second tank 18. Still another passageway 80 is provided in the cap 38 extending from the pressure chamber 68 to a tube 82. As will hereinafter be described, the tube 82 is connected to an outlet 84 for processed water such that the pressure of the processed water 86 is applied to the pressure chamber 68. Still another passageway 88 is provided in the cap 38 to provide a path for the discharge of concentrate water from between the prefilter 20 and the reverse osmosis membrane 22. The passageway 88, which is provided with a flow regulator 90, is connected to a discharge tube 92.

A second flange structure 94 is provided on the outer surface of the second tank 18 near its open end for securing the bladder 16 and the second tank 18 in the open end of the pressure tank 12. A ring 96 provide at the open end of the bladder 16 is captured in a sealing relationship between the open end of pressure tank 12 and the lower surface of the flange 94. A clamping force is applied between the tank 12 and the flange 94, such as is shown by the clamp 98.

The second flange structure 94 is also provided with an internally locking aperture 100 which receives a snap lug end of a tank valve 102 having two outlets. The aperture 100 leads to the processed water storage space 86 between the second tank 18 and the bladder 16. One of the outputs of the tank valve 102 is connected to a post filter 104, which may be of the charcoal type, which in turn supplies water to the point of use through a tube 106. The post filter 104 is secured to the outer surface of the pressure tank 12 by a clamp 108. The other output of the tank valve 102 is connected to tube 82 to supply processed water pressure to pressure chamber 66 as previously described.

Figure 3:
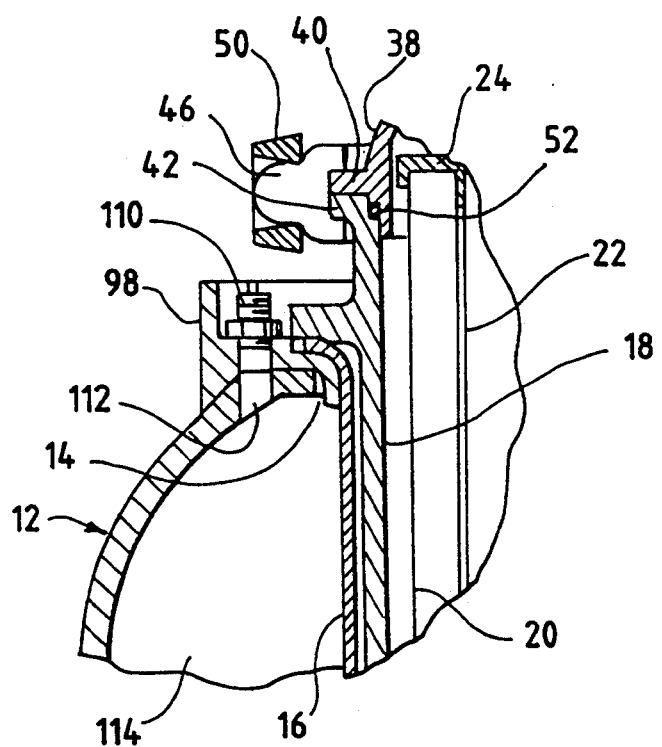
FIG. 3 is a partial cross section of the integrated reverse osmosis water processing and storing system of FIG. 1 taken at an angle to the cross section of FIG. 1 so as to show an air valve for charging the tank with air.

As shown in FIG. 3, the clamp 98 is provided with an air valve 110 which is position over a hole 112 in the pressure tank 12. The air valve 110 is provided for precharging the volume 114 between the pressure tank 12 and the bladder 16, so as to maintain pressure on the processed water in the bladder.

The operation of the integrated reverse osmosis water treatment and storage system of this invention will now be briefly described. Raw water enters the system through the shut-off valve 62 and flows through passageway 73 to the space between the inner wall of the tank 18 and the outside of prefilter 20. It then flows through the prefilter 20 so as to surround the outer surface of the reverse osmosis membrane assembly 22. The processed water which passes through the reverse osmosis membrane flows to the hollow center of the membrane assembly and into the cylindrical extensions 28 and 30. Processed water flows through the extension 28 and the check valve 36 into bladder 16. Processed water within the bladder may be then discharged through the tank valve 102 and the post filter 104 to the tube 106 for supply to a point of use.

As water is being processed through the reverse osmosis membrane, it is desirable for reject or concentrate water to continue to flow from the input side of the membrane so as to remove the contaminants therefrom. The concentrate water flows through the flow regulator 90 into the discharge tube 92. The flow regulator regulates the flow of waste water.

The volume 114 between the outer surface of the bladder 16 and the inner surface of the pressure vessel 12 can be precharged with air, in a typical system to one to two pounds per square inch above atmospheric pressure. However, a precharge is not necessary for purified product water delivery. The water storage system of this invention results in less back pressure on the solvent flux, thereby improving the reverse osmosis process across the membrane. Solvent flux rate being defined as $$\text{SOLVENT FLUX RATE} = \frac{\text{Permeability of membrane}}{\text{Membrane thickness}} (\Delta \rho - \Delta \pi)$$

where $\Delta \rho$ = differential of the back pressure

= feed water pressure − product back pressure

= $(P_f - P_p)$ and where $\Delta \pi$ = osmotic pressure difference of the solution = feed solution osmotic pressure − product solution osmotic pressure = $(\pi_f - \pi_p)$ It should also be recognized that the bladder 16 will provide some resistance to expansion, thereby applying a pressure to the processed water confined therein.

With the pressure of the air in the volume between the bladder 16 and the tank 12 being defined as $P_A$ and $V_A$ respectively, and the pressure on the water and the volume of the water in the bladder 16 being defined as $P_W$ and $V_W$ respectively, and the material resistance of the bladder to expansion $R_B$:

$$P_W V_W = P_A V_A + R_B$$

The shut-off valve 62 is pressure regulated, responding to the pressure within the bladder 16. The shut-off valve is typically set such that when the product water storage pressure in the bladder 16 is equal to one half of the supply water pressure, the shut-off valve will close, terminating the flow of supply water to the water processing system.

It is, of course, obvious that the bladder 16 will expand as it is filled with water until the pressure of the product water reaches half of that of the supply water pressure such that the shut-off valve closes. With the shut-off valve 62 closed, due to increased product water pressure within the bladder 16, the terminating water pressure within the center of the membrane 22 pushes the water from within the second tank 18 through the waste water passage 92. Product water is prevented from flowing from the bladder 16 back into the membrane 22 by the check valve 36.

The prefilter 20 and the reverse osmosis membrane assembly 22 are easily replaced when necessary, by removing the clips 48 and 50 from the clamps 44 and 46, such that the cap 38 may be removed from the second tank 18.

Thus, in accordance with this invention an integrated reverse osmosis drinking water supply system is provided which is of simplified construction, and which is readily installed for use in a household water system.

It should be apparent to those skilled in the art that what has been described is considered at present to be a preferred embodiment of the integrated reverse osmosis water treatment and storage system of this invention. In accordance with the patent statutes, changes may be made in the integrated reverse osmosis water treatment and storage system as shown and described without actually departing from the true spirit and scope of this invention. The intended claims are intended to cover all such changes and modifications which fall within the true spirit and scope of this invention.

I claim:

1. A reverse osmosis system comprising:
   a pressure tank having an open end,
   an expandable bladder received within said pressure tank, said bladder having an open end,
   means for securing and sealing said open end of said bladder in said open end of said pressure tank, so as to form a first enclosed variable volume between said pressure tank and said bladder,
   a second tank assembly including a second tank received within said bladder, said second tank having an open end and a closed end,
   means for securing and sealing said second tank assembly in the open end of said bladder, so as to form a second enclosed variable volume between said bladder and said second tank,
   a prefilter and a reverse osmosis membrane assembly received within said second tank,
   said second tank assembly including a cap for closing said open end of said second tank,
   said second tank assembly having a first opening through which raw water may enter said second tank, such that the raw water may flow through said prefilter to said reverse osmosis membrane assembly,
   said second tank assembly having a second opening through which purified product water which has passed through said prefilter and said reverse osmosis membrane assembly may flow into said second variable volume,
   said second tank assembly having a third opening through which concentrated water which has passed through said prefilter but not through said reverse osmosis membrane assembly may flow for disposal,
   said second variable volume having a discharge opening through which purified product water may flow for use,
   whereby a reverse osmosis system including a prefilter, a reverse osmosis assembly and a storage tank for purified product water is constructed as compact assembly.

2. The reverse osmosis system of claim 1, wherein a check valve is provided in said second opening, such that purified product water may flow from said second tank into said second enclosed variable volume, but not from said second enclosed variable volume into said second tank.

3. The reverse osmosis system of claim 1, wherein a flow regulator is provided in said third opening to regulate the flow of concentrated water.

4. The reverse osmosis system of claim 1, wherein a shutoff valve is provided in said first opening for controlling the supply of feed water.

5. The reverse osmosis system of claim 4, wherein said shutoff valve is automatically opened and closed in response to the pressure of the purified product water in said second enclosed variable volume.

6. The reverse osmosis system of claim 5, wherein said shutoff valve is of the pressure diaphragm type, with the diaphragm being subjected to the pressure of purified product water in said second enclosed variable volume, such that when said pressure drops to a predetermined level, said valve opens to permit raw water to enter said second pressure tank through said first opening.

7. The reverse osmosis system of claim 1, wherein said first and third openings are formed in said cap.

8. The reverse osmosis system of claim 1, wherein said pressure tank, said bladder, said second tank, said hollow prefilter, and said reverse osmosis membrane assembly are all of a generally elongated cylindrical shape having a top and a bottom.

9. The reverse osmosis system of claim 1, wherein said second opening into said second tank is formed in the bottom of said second tank.

10. The reverse osmosis system of claim 1, wherein a first supporting means is provided on the bottom of said second tank and a second supporting means is provided on said cap for supporting said hollow prefilter and said reverse osmosis membrane assembly in said second tank such that raw water entering said second tank must first flow through said prefilter and then through said reverse osmosis assembly to reach said second opening.

11. The reverse osmosis system of claim 10, wherein said first supporting means comprises a pair of generally concentric annular projections, one of which makes a sealing engagement with the bottom of said hollow prefilter and the other of which makes a sealing engagement with the bottom of said reverse osmosis membrane assembly.

12. The reverse osmosis system of claim 10, wherein said second supporting means comprises a pair of generally concentric annular projections, one of which makes a sealing engagement with the top of said hollow prefilter, and the other of which makes a sealing engagement with the top of said reverse osmosis membrane assembly.

13. The reverse osmosis system of claim 1, wherein a flange is provided on said second tank adjacent said open end, said open end of said bladder being engaged between the open end of the pressure tank and said flange to provide a first seal between said pressure tank and said bladder and a second seal between said bladder and said second tank.

14. The reverse osmosis system of claim 1, wherein said cap on said second tank may be easily removed to remove and replace said hollow prefilter and said reverse osmosis membrane assembly.

15. The reverse osmosis system of claim 1, wherein a post filter is supported by said pressure tank, and means are provided to cause the stored product water to pass through said post filter prior to its use.

16. The reverse osmosis system of claim 1, wherein the air in said first enclosed variable volume is compressed by the expansion of said second variable volume as it is filled with purified product water, whereby based on the ideal gas law principle, the pressure of the air, and the material resistance of the bladder to expansion, supplies the pressure to deliver the purified product water through said discharge opening for use.

17. The reverse osmosis system of claim 1, wherein the back pressure of the purified product water in said second variable volume is minimized, thus increasing the differential of the back pressure and thereby the solvent flux rate, so as to provide increased production of purified product water.

* * * * *